(12) United States Patent
Li

(10) Patent No.: US 6,385,174 B1
(45) Date of Patent: May 7, 2002

(54) METHOD AND APPARATUS FOR TRANSMISSION OF NODE LINK STATUS MESSAGES THROUGHOUT A NETWORK WITH REDUCED COMMUNICATION PROTOCOL OVERHEAD TRAFFIC

(75) Inventor: Chris Cho-Pin Li, New York, NY (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/705,822

(22) Filed: Nov. 6, 2000

Related U.S. Application Data
(60) Provisional application No. 60/164,940, filed on Nov. 12, 1999.

(51) Int. Cl.[7] ............................................. H04L 12/66
(52) U.S. Cl. ..................................................... 370/252
(58) Field of Search ................................. 370/252–256, 370/448, 462, 408–411, 350–351, 237, 433, 355, 506, 375, 376, 420, 524, 220, 360; 703/17; 709/238–243; 455/426, 552, 414, 74.1, 504; 375/347; 379/269, 274

(56) References Cited

U.S. PATENT DOCUMENTS

| | | | |
|---|---|---|---|
| 4,747,130 A | * 5/1988 | Ho ............................... 370/375 |
| 4,958,343 A | 9/1990 | Abramovici et al. |
| 5,068,916 A | * 11/1991 | Harrison et al. .............. 455/39 |
| 5,231,634 A | 7/1993 | Giles et al. |
| 5,233,604 A | 8/1993 | Ahmadi et al. |
| 5,241,542 A | 8/1993 | Natarajan et al. |
| 5,317,566 A | 5/1994 | Joshi |
| 5,530,912 A | 6/1996 | Agrawal et al. |
| 5,535,195 A | 7/1996 | Lee |
| 5,631,897 A | * 5/1997 | Pacheco et al. .............. 370/237 |
| 5,684,794 A | 11/1997 | Lopez et al. |
| 5,687,168 A | 11/1997 | Iwata |
| 5,745,694 A | 4/1998 | Egawa et al. |
| 5,805,593 A | 9/1998 | Busche |
| 5,805,977 A | 9/1998 | Hill et al. |

(List continued on next page.)

FOREIGN PATENT DOCUMENTS

| | | |
|---|---|---|
| DE | 4106971 A1 | 9/1992 |
| JP | 06121373 | 4/1994 |
| JP | 08125654 | 5/1996 |
| JP | 09200850 | 7/1997 |
| JP | 09205668 | 8/1997 |
| JP | 11032373 | 2/1999 |
| WO | WO 09718637 | 5/1997 |

OTHER PUBLICATIONS

Lin, C.R. et al, "Real–time support in multihop wireless networks", Wireless Networks 5 (1999), pp. 125–135.

(List continued on next page.)

*Primary Examiner*—Wellington Chin
*Assistant Examiner*—Prenell Jones

(57) ABSTRACT

A wireless network includes a plurality of nodes arranged into clusters with each cluster having cluster member nodes and a designated cluster head node. The nodes communicate with each other via an intranet protocol, while the network may communicate with other external networks in accordance with an internetworking protocol (e.g., a Radio Open Shortest Path First (ROSPF) protocol). A database within each network node contains link information for that node, while ROSPF Link-State Advertisement (LSA) type packets or database update messages contain information to update the node databases. The ROSPF LSA type packets are transmitted to neighbors of each node to enable each database to maintain current information. In order to reduce overhead of transmitting numerous LSA type packets, the present invention transmits the ROSPF LSA type packet within an intranet protocol beacon type or node status packet that is periodically broadcasted within the network.

37 Claims, 4 Drawing Sheets

U.S. PATENT DOCUMENTS

| | | | |
|---|---|---|---|
| 5,805,995 | A | 9/1998 | Jiang et al. |
| 5,825,772 | A | 10/1998 | Dobbins et al. |
| 5,881,095 | A | 3/1999 | Cadd |
| 5,896,561 | A | 4/1999 | Schrader et al. |
| 5,903,559 | A * | 5/1999 | Acharya et al. ............ 370/355 |
| 5,909,651 | A | 6/1999 | Chander et al. |
| 6,052,594 | A | 4/2000 | Chuang et al. |
| 6,130,881 | A | 10/2000 | Stiller et al. |
| 6,192,053 | B1 * | 2/2001 | Angelico et al. ........... 370/448 |
| 6,208,870 | B1 | 3/2001 | Lorello et al. |
| 6,246,875 | B1 | 6/2001 | Seazholtz et al. |

OTHER PUBLICATIONS

Koubias, S.A. et al, "Further results on the performance . . . ATP–2 for local area networks", IEEE Transactions on Computers, vol. V37, No. 3, 1988, pp. 376–383.

Bandai, M. et al., "Performance analysis of a channel reservation . . . unicast and multicast packets", Trans. Inst. Electron. Inf. Comm. Eng. B–I, Japan, vol. J82B–1, No. 2, Feb. 1999, pp. 236–250.

Riera, M.O.I. et al, "Variable channel reservation . . . mobility platforms", VTC '98, 48$^{th}$ IEEE Commun. Lett. (USA), vol. 2, No. 7, Jul. 1998, pp. 1259–1263.

Kee, Chaing Chua et al, "Probabilistic channel reservation . . . pico/microcellular networks", IEEE Commun. Lett. (USA), vol. 2, No. 7, Jul. 1998, pp. 195–196.

Tripathi, S.B. et al., "Performance analysis of microcellisation . . . cellular wireless networks", 1997 IEEE Inter. Conf. On Personal Wireless Communications, pp. 9–14.

Boumerdassi, S., "A new channel reservation . . . cellular communication systems", Broadband Communications, Fourth Intern. Conf. On Broadband Commun., 1998, pp. 157–168.

Wei, Huang et al, "Channel reservation for high rate service in cellular networks", 1997 IEEE Pacific Rim Conference, vol. 1, pp. 350–353.

Konishi, S. et al, "Flexible transmission bandwidth . . . for NGSO MSS networks", IEEE J. Sel. Areas Commun. (USA), vol. 15, No. 7, Sep. 1997, pp. 1197–1207.

Ohta, C., et al, "Effects of moving mobiles . . . micro–cellular systems", IEEE Globecom 1996, vol. 1, 1996, pp. 535–539.

Kanazawa, A. et al, "Performance study of . . . micro–cellular systems", IEICE Trans. Fundam. Electron. Commun. Comput. Sci. (Japan), vol. E79–A, No. 7, Jul. 1996, p. 990–6.

Harms, J.J. et al, "Performance modeling of a channel reservation service", Comput. Netw. ISDN Syst. (Netherlands), vol. 27, No. 11, Oct. 1995, pp. 1487–1497.

Harms, J.J. et al, "Performance of scheduling algorithms for channel reservation", IEE Proc., Comput. Gigit. Tech. (UK), vol. 141, No. 6, Nov. 1994, pp. 341–346.

Barghi, H. et al, "Time constrained performance . . . for local networks", Eleventh Annual International Phoenix Conference on Computers and Communications, 1992, pp. 644–650.

Masuda, E., "Traffic evaluation of . . . on a T–S–T network", Electron. Commun. Jpn. 1, Commun. (USA), vol. 72, No. 8, Aug. 1989, pp. 104–119.

"PacTel Withdraws . . . dialtone operations", Multichannel News 96–01–29, pp. 48.

Iwata et al, "Scalable Routing . . . Wireless Networks", IEEE Journal on Selected Areas in Communications, vol. 17, No. 8, Aug. 1999, pp. 1369–1379.

Joa–Ng, et al, "A Peer–to–Peer . . . Mobile Ad Hoc Networks", IEEE Journal on Selected Areas in Communications, vol. 17, No. 8, Aug. 1999, pp. 1415–1425.

Das et al, "Routing in ad hoc networks using a spine", Proceedings of 6$^{th}$ Intern. Conf. On Computer Commun. And Networks, Las Vegas, 1997, pp. 34–39.

Krishna et al, "A cluster–based approach for routing in ad–hoc networks", Proceedings of the Second USENIX Symposium on Mobile and Location—Independent Computing, 1995, pp. 1–10.

Baker D.J. et al, "The architectural organization of a mobile radio networks via a distributed algorithm", IEEE Trans. Commun., vol. Com–29, No. 11, pp. 1694–1701, Nov. 1981.

Baker, D.J. et al, "A distributed algorithm . . . mobile radio network", in Proc. IEEE ICC'82, pp. 2F.6.1–2F.6.5.

Ephremides, A. et al, "A design Concept . . . hopping signaling", Proc. IEEE, vol. 75, No. 1, Jan. 1987, pp. 56–73.

Gerla M. et al, "Multicluster, mobile, multimedia radio network", Baltzer Journals, Jul. 12, 1995, pp. 1–25.

Lin, C.R. et al, "Adaptive clustering for mobile wireless network", IEEE JSAC, Sep. 1997, pp. 1–21.

MingLiang et al, "Cluster Based Routing Protocol (CBRP) Functional Specification" Internet–Draft, Aug. 14, 1998.

Moy, J., "OSPF version 2", RFC2328, Apr. 1998.

Kweon, Seok–Kyo, Real–Time . . . Packet Networks (Quality of Service, ATM, Ethernet), 1998, pp. 1–158.

Huang, Yih, Group Communication Under Link–State Routing (Multipoint Communications, Leader Election), 1998, pp. 1–204.

Behrens, Jochen, Distributed Routing For Very Large Networks Based on Links Vectors (Routing Algorith), 1997, pp. 1–109.

Khosravi–Sichani, et al, Performance Modeling and Analysis of the Survivable Signaling Network, Proceedings—IEEE Military Communications Conference, v 3, 1991, pp. 880–884.

Bellur, et al, "a Reliable, Efficient Topology . . . Dynamic Networks", IEEE INFOCOM '99, Conf. On Computer Commun. Proceed. 18$^{18}$ Annual Joint Conf. Of IEEE Comp. And Commun. Societies, vol. 1, 1999, pp. 178–186.

Ching–Chuan, et al, "On–Demand Multicast in Mobile Wireless Networks", Proceed. 6$^{th}$ Intern. Conf. On Network Protocols, 1998, pp. 262–270.

Garcia–Luna–Aceves, et al, "Scalable Link–State Internet Routing", Proceed. 6$^{th}$ Intern. Conf. On Network Protocols, 1998, pp. 52–61.

Huang et al, "Optimal Switch–Aided Flooding Operations in ATM Networks", 1998 IEEE ATM Workshop Proceedings, 1998, pp. 329–338.

Behrens, et al, Fast Disseminationof Link . . . Updates or Age Fields, Proceed. 17$^{th}$ Intern. Conf. On Distributed Computing Systems, 1997, pp. 51–58.

Garcia–Luna–Aceves, et al, "Distributed, Scalable Routing . . . States", IEEE J. Sel. Areas Commun. (USA), vol. 13, No. 8, Oct. 1995, pp. 1383–1395.

Behrens, et al, "Distributed, Scalable Routing Based on Link–State Vectors", Comput. Commun. Rev. (USA), vol. 24, No. 4, Oct. 1994, pp. 136–147.

Rutenburg et al, "How to Extract Maximum . . . Topology Updates", IEEE INFOCOM '93, Conf. On Comp. Commun. Proceed. $12^{th}$ Annual Joint Conf. Of the IEEE Comp. And Commun. Societies, 1993, pp. 1004–1013.

Garcia–Luna–Aceves, "Reliable Broadcast of Routing Information Using Diffusing Computations", GLOBECOM '92, Communication for Global Users, IEEE Global Tel. Conf., 1992, pp. 615–621.

Moy, J., "OSPF Version 2", RFC 1583, Mar. 1994.

Johnson et al, "Dynamic Source Routing in Ad Hoc Wireless Networks", Mobile Computing, 1996.

Broch et al, "The Dynamic Source Routing Protocol for Mobile Ad Hock Networks", IETF internet draft, Mar. 13, 1998, Oct. 22, 1999.

Johnson et al, "The Dynamic Source Routing Protocol for Mobile Ad Hock Networks", IETF internet draft, Nov. 17, 2000.

Park et al, "Temporally–Ordered Routing Algorithm (TORA) version 1", IETF internet draft, Aug. 7, 1998, Oct. 22, 1999, Nov. 24, 2000.

Perkins, "Ad Hoc On Demand Distance Vector (AODV) Routing", IETF Internet draft, Nov. 20, 1997, Nov. 24, 2000.

Deering et al, "Protocol Independent Multicast Version2, Dense Mode Specification", IETF internet draft, May 21, 1997.

Garcia–Luna_Aceves, "Source Tree Adaptive Routing (STAR) Protocol", IETF Draft, Oct. 1999.

Wu et al, "Ad Hoc Multicast Routing Protocol Utilizing Increasing id–numbers (AMRIS)", IETF internet draft, 1998.

Ballardie, "Core Based Tree Multicast Routing", RFC 2186, Sep. 1997.

Ballardie et al, "Core Based Tree (CBT)", SIGCOMM '93, 1993, pp. 86–94.

Chiang et al, "Shared Tree Wireless Network Multicast", IC3N'97, Apr. 1997, pp. 1–16.

Chiang et al, "Forwarding Group Multicast Protocol (FGMP) for Multihop", Mobile Wireless Networks, ACM–Baltzer Journal of Cluster Computing, 1998.

Lee et al, "On–Demand Multicast Routing Protocol (ODMRP) for Ad Hoc Networks", IETF internet draft, Jan. 2000.

North et al, "Wireless Networked Radios: Comparsion of Military, Commerical and R&D Protocols", Second Annual UCSD Conference on Wireless Communications, Mar. 3, 1999, pp. 1–6.

* cited by examiner

METHOD AND APPARATUS FOR TRANSMISSION OF NODE LINK STATUS MESSAGES THROUGHOUT A NETWORK WITH REDUCED COMMUNICATION PROTOCOL OVERHEAD TRAFFIC

CROSS-REFERENCE TO RELATED APPLICATIONS

This application claims priority from U.S. Provisional Patent Application Serial No. 60/164,940, entitled "Flooding of ROSPF Link-State Advertisements Through Clustering Beacons for Drastic Reduction of ROSPF Overhead" and filed Nov. 12, 1999. The disclosure of that provisional application is incorporated herein by reference in its entirety.

BACKGROUND OF THE INVENTION

1. Technical Field

The present invention pertains to communication systems. In particular, the present invention pertains to a communication system employing broadcast-based flooding schemes for synchronizing routing databases with reduced communication protocol overhead.

2. Discussion of Related Art

Generally, wireless networks maybe arranged in a two-tier architecture similar to that of conventional cellular telephone systems. The first tier typically includes clusters or cells each including a plurality of communication nodes or cluster members. One node within each cluster is designated as a cluster head or base station. The second tier includes a backbone network formed of the cluster head nodes to enable communications between different clusters (e.g., for data transmitted over greater distances). The formation of clusters and designation of cluster head nodes is generally performed dynamically and in accordance with an intranet protocol (e.g., a protocol for communications within the two-tier network) that further performs routing functions within the network. The intranet protocol is preferably a link-state type of routing protocol that is implemented on the backbone network. The cluster head nodes each include a database that is synchronized with other cluster head node databases by transference of Link- State Advertisement (LSA) packets in accordance with the protocol. These databases include information enabling the cluster head nodes to determine appropriate paths for routing messages through the network, while the LSA packets provide information to update the databases.

In order to facilitate internet routing or routing between the two-tier and other external networks (e.g., the Internet), a modified version of the conventional Open Shortest Path First (OSPF) Protocol is employed. The OSPF protocol is basically a routing protocol employed for Internet Protocol (IP) type networks, while the modified protocol or Radio Open Shortest Path First (ROSPF) protocol is similar to OSPF, but is adapted for use with radio or wireless networks. For examples of implementation of the OSPF Protocol, reference is made to RFC 1583, Moy, "OSPF Version 2," March 1994, the disclosure of which is incorporated herein by reference in its entirety. Thus, the ROSPF protocol is basically an internetworking or gateway protocol facilitating communications with external networks.

Routing is accomplished in the OSPF protocol by each network node having a routing database containing information related to network topology (e.g., links between network nodes). The routing database is utilized by each node to determine a path for transmitting a message to a destination site. The routing databases are updated by exchanging Link-State Advertisement (LSA) packets between neighboring nodes. These packets generally include information related to current links of network nodes and are typically transferred periodically and/or in the event of a modification to the network topology. The OSPF protocol designates a particular router to flood LSA packets to neighbors in broadcast type networks, while LSA packets are transmitted via point-to-point and/or broadcast packets within non-broadcast type networks. The ROSPF protocol employed by the two-tier network described above is similar to the OSPF protocol and exchanges LSA type packets between neighbors (e.g., cluster head and member nodes) to synchronize routing databases as described above. Since the two-tier network is not a broadcast type network, an LSA packet is sent as a point-to-point message to each of its protocol neighbors.

The above-described technique for transmitting LSA packets on the two-tier network suffers from several disadvantages. In particular, the intranet and ROSPF protocols generate control traffic where the amount of traffic increases with network size. In fact, the amount of ROSPF overhead traffic increases at a significantly greater rate than network capacity as network size increases, thereby degrading network performance. Although the ROSPF protocol introduces additional overhead in initializing neighbors and exchanging database descriptions, the predominant portion of the overhead is attributed to the flooding or transmission of LSA packets. As a result of the rate of increased overhead, the network becomes unsuitable to transport user traffic or maintain a functioning state when the network includes greater than approximately one-hundred fifty nodes. Since the two-tier network may employ a maximum of approximately one-thousand nodes, the increased overhead limits performance of small-scale networks and restricts deployment of the protocol for large-scale networks.

The present invention overcomes the aforementioned problems and achieves transmission of LSA type or database update packets for synchronization of node routing databases with a reduced rate of overhead increase in relation to network size. This is accomplished by inserting the ROSPF protocol database update packets within intranet protocol beacon type or node status packets to reduce the rate of protocol overhead. The node status packets are periodically transmitted by cluster member and cluster head nodes to advertise the presence of that node to the network. The present invention minimizes the impact of protocol overhead on network throughput, and permits an ROSPF type protocol to be utilized on large-scale wireless networks. Thus, networks may employ the protocol, while scaling to a greater size.

OBJECTS AND SUMMARY OF THE INVENTION

Accordingly, it is an object of the present invention to reduce the rate of overhead of a communication routing protocol and enable employment of the protocol with large-scale type networks.

It is another object of the present invention to transmit database update packets of a communication protocol within packets of other protocols to reduce communication protocol overhead and enhance communication network throughput.

Yet another object of the present invention is to synchronize routing databases of communication network nodes in a manner that minimally affects network throughput.

The aforesaid objects may be achieved individually and/or in combination, and it is not intended that the present invention be construed as requiring two or more of the objects to be combined unless expressly required by the claims attached hereto.

According to the present invention, Link-State Advertisement (LSA) type or database update messages or packets of an internetworking protocol are transmitted within a wireless communication system or network via insertion of the packet within packets of an intranet protocol. Specifically, a wireless network includes a plurality of nodes arranged into clusters with each cluster having cluster member nodes and a designated cluster head node. The nodes communicate with each other via an intranet protocol, while the network may communicate with other external networks in accordance with an internetworking protocol (e.g., a modified version of the conventional Open Shortest Path First (OSPF) routing protocol, or a Radio Open Shortest Path First (ROSPF) protocol). A database within each network node contains link information for that node, while the ROSPF LSA type packets contain information to update the node databases. The ROSPF LSA type packets are transmitted to neighbors of each node to enable each database to maintain current information. In order to reduce overhead of transmitting numerous LSA type packets, the present invention transmits the ROSPF LSA type packet within an intranet protocol beacon type or node status packet that is periodically broadcasted within the network. Thus, the overhead rate of increase is reduced, thereby permitting the network to utilize an ROSPF type protocol while expanding to larger scales.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1A:
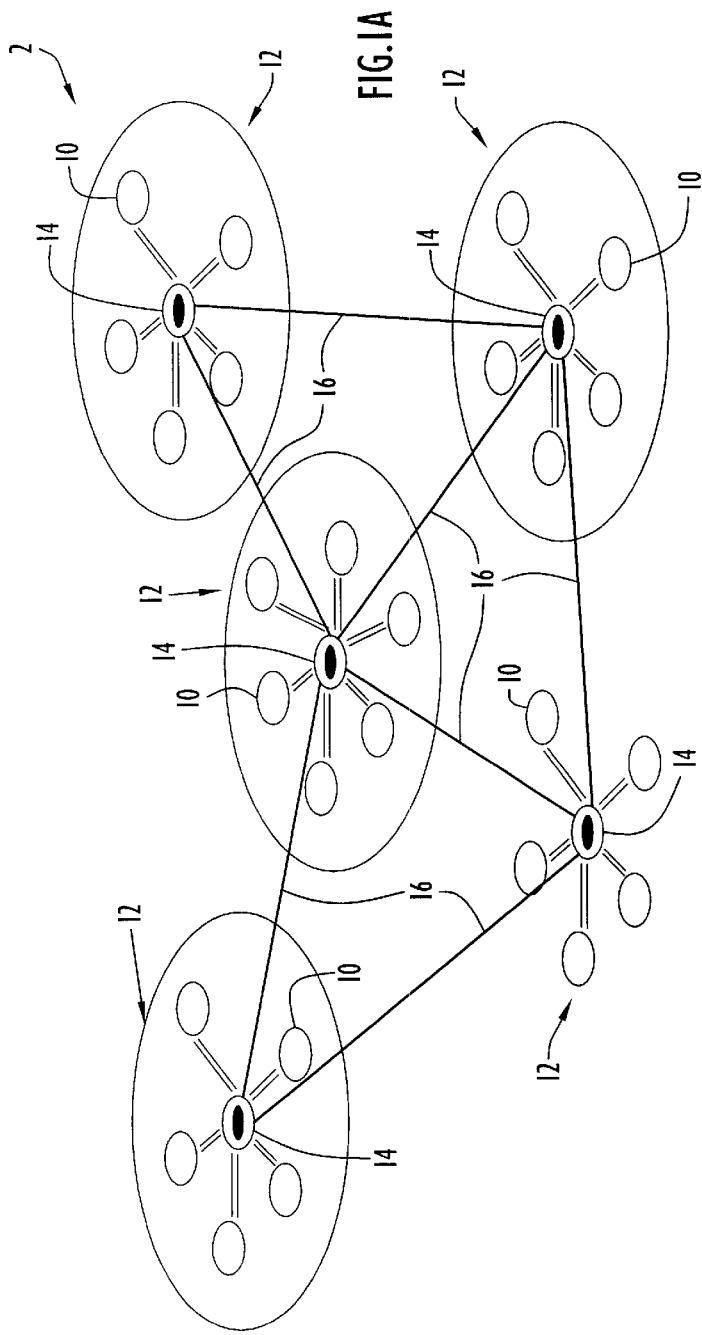
FIG. 1A is a diagrammatic illustration of network nodes according to the present invention arranged in an exemplary communication network.

Network nodes according to the present invention arranged in an exemplary two-tier wireless network are illustrated in FIG. 1A. Specifically, wireless network 2 includes a plurality of nodes 10 arranged in cells or clusters 12. Each cell or cluster includes corresponding cluster member nodes 10 with one of those cluster member nodes designated as a cluster head node or base station 14. These cluster arrangements form the first tier of network 2 and facilitate communication within a cluster between the cluster head and member nodes preferably utilizing a first transmission frequency. The head nodes of each cluster are in communication with each other, preferably utilizing a second transmission frequency, and form a backbone network 16. The backbone network essentially forms the second tier of network 2 and facilitates communications between nodes of different clusters (e.g., generally providing communications over greater distances). The architecture of network 2 is similar to that of conventional cellular telephone systems, except that network 2 employs an intranet protocol (e.g., a protocol for communications within the two-tier network) providing dynamic selection of cells and cluster head nodes as described below.

Figure 1B:
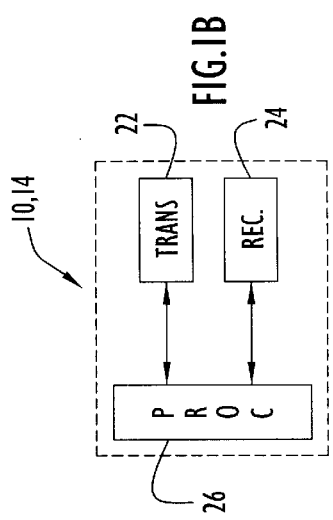
FIG. 1B is a block diagram of a network node of FIG. 1.

A network node 10 according to the present invention is illustrated in FIG. 1B. Specifically, node 10 includes a transmitter 22, a receiver 24 and a processor 26. The processor is preferably implemented by a conventional microprocessor or controller and controls the node to transmit and receive messages in accordance with the communication protocols described below. The transmitter is preferably implemented by a conventional transmitter and transmits messages from the processor, preferably in the form of radio frequency (RF) signals, in accordance with processor instructions. Receiver 24 is typically implemented by a conventional receiver and configured to receive signals, preferably in the form of radio frequency (RF) signals, transmitted by the transmitter of another node. The receiver receives transmitted signals and forwards the received signals to processor 26 for processing. A present invention head node 14 is substantially similar to node 10 described above.

The arrangement of nodes 10 within clusters 12 and the designation of cluster head nodes 14 are dynamically determined by an intranet protocol that handles routing of packets within network 2. The intranet protocol is preferably a link-state type routing protocol that is implemented on backbone network 16. Cluster head nodes 14 each maintain a database including information enabling the cluster head to determine appropriate paths for routing messages through the network. The information typically relates to links between the various network nodes. The cluster head databases are synchronized in accordance with the protocol by transference of Link-State Advertisement (LSA) packets between cluster head nodes that provide network information to update the databases. In addition, each node (e.g., cluster head and member nodes) periodically broadcasts a beacon type or node status packet in accordance with the intranet protocol. This packet basically advertises the presence of a node within the network. The rate of transmission of a node status packet by a cluster head node is significantly greater than the transmission rate for that packet by a cluster member node since cluster head node status packets are typically utilized for "keep alive" and neighbor discovery purposes. Thus, the time interval ($T_{CH}$) between transmissions of node status packets by a cluster head node is significantly less than the corresponding time interval ($T_{CM}$) between transmissions of those packets by a cluster member node.

With respect to communications between network 2 and other external networks (e.g., the Internet), the network employs a Radio Open Shortest Path First (ROSPF) protocol. This protocol is basically a modified version of the conventional Open Shortest Path First (OSPF) protocol commonly utilized for Internet Protocol (IP) type networks. Since the OSPF protocol generates significant overhead when applied to ad-hoc networks (e.g., networks having temporary or wireless connections where communication devices are part of the network during a communication session or, in the case of mobile systems, while in proximity to the network), such as network 2, that protocol has been modified to derive the ROSPF protocol suitable for use with wireless or radio networks. According to the ROSPF protocol, each node within network 2 maintains a routing database including information enabling the node to determine an appropriate path for routing a message to the external network. The information contained within the node databases typically relates to links between the various network nodes. The ROSPF protocol is a link-state type routing protocol and provides for synchronization of node databases through transmission of Link-State Advertisement (LSA) type or database update packets to each network node. These packets are conventionally transmitted to each neighboring network node via plural point-to-point messages (e.g., messages from a source node to a specific destination network node) in response to changes in network topology, an external network connected to network 2 or other modifications to the network facilitating changes in a node database. When a database update packet is received, a point-to-point OSPF type acknowledgment (ACK) packet is commonly transmitted to the source node from the destination node to indicate packet reception.

The present invention basically employs an enhanced technique to transmit the ROSPF database update packets within network 2, while reducing overhead traffic. In particular, a member node 10 of a cluster 12 transmits a database update packet to a corresponding cluster head node 14 via a point-to-point message as described above. Since the cluster head node is in communication with its corresponding cluster member nodes, reduced transmissions may be realized if one reliable broadcast message is utilized to transmit the database update packet. Further, the broadcast message may be utilized to transmit the database update packet to neighboring cluster head nodes that further transmit the packet in a like manner, thereby facilitating transmission of the packet throughout network 2. Accordingly, the present invention provides for transmission of the received database update packets by the cluster head node to its corresponding member nodes and neighboring network cluster head nodes within intranet protocol beacon type or node status packets that are periodically transmitted throughout the network as described above. Since the node status packets typically contain a relatively low quantity of data, there exists sufficient storage within that packet to contain at least one database update packet. Thus, significant reduction in transmission overhead may be achieved through use of intranet protocol node status packets to transmit the ROSPF database update packets. In addition, reception of database update packets by cluster head nodes is impliedly acknowledged (e.g., without transmission of specific point-to-point type acknowledgment packets) as described below. The cluster head nodes subsequently transmit the database update packets in a like manner to their neighbors to facilitate transmission of the packet throughout network 2.

The node status packets are preferably transmitted utilizing a reliable broadcast technique, such as the scheme disclosed in the co-pending U.S. Patent Application having Docket No. 0918.0033C, entitled "Method and Apparatus for Broadcasting Messages in Channel Reservation Communication Systems" and filed Nov. 3, 2000, the disclosure of which is incorporated herein by reference in its entirety. In order to enhance performance reliability, the node status packets may be transmitted two or more times. If transmission of broadcast messages achieves a ninety percent success rate, transmitting those messages twice enhances that rate to approximately ninety-nine percent. Accordingly, the database update packets are preferably transmitted twice for improved reliability as described below.

The intranet protocol typically includes several layers to facilitate communications between network nodes, and is typically implemented by the processors of those nodes. Packet concatenation functions are generally accomplished within the intranet protocol by a layer that passes traffic from a protocol intranet layer to a protocol link layer and from the link layer to appropriate intranet layer modules. Since insertion of ROSPF database update packets within intranet protocol node status packets is basically a type of packet concatenation, this process is preferably implemented within the intranet protocol concatenation layer.

The node status packets are periodically transmitted in accordance with the intranet protocol as described above. However, those packets may not be immediately available to transport a database update packet to other network nodes in the event that a database update packet is received or generated within the time interval between transmission of the node status packets. Accordingly, a queue, preferably in the form of a First In First Out (FIFO) queue, is utilized by a node processor to store update database packets until a node status packet is available for transmission. The database update packets are initially placed onto the queue upon receipt by the intranet protocol concatenation layer. When a node status packet is generated for transmission, the concatenation layer inserts an appropriate quantity of database update packets stored in the queue into the node status packet. The quantity of database update packets inserted into the node status packet is based on the size of the stored database update packets and the amount of available storage capacity within the node status packet. The integrated node status and database update packet is subsequently processed and transmitted in accordance with the intranet protocol. Since the database update packets are preferably transmitted two or more times, each instance of a particular database packet is placed within a different node status packet for reliability purposes. For example, when a database update packet is to be transmitted twice, that database update packet is placed within two separate node status packets. The database update packets remain on the queue until the desired quantity of transmissions have occurred.

Figure 2:
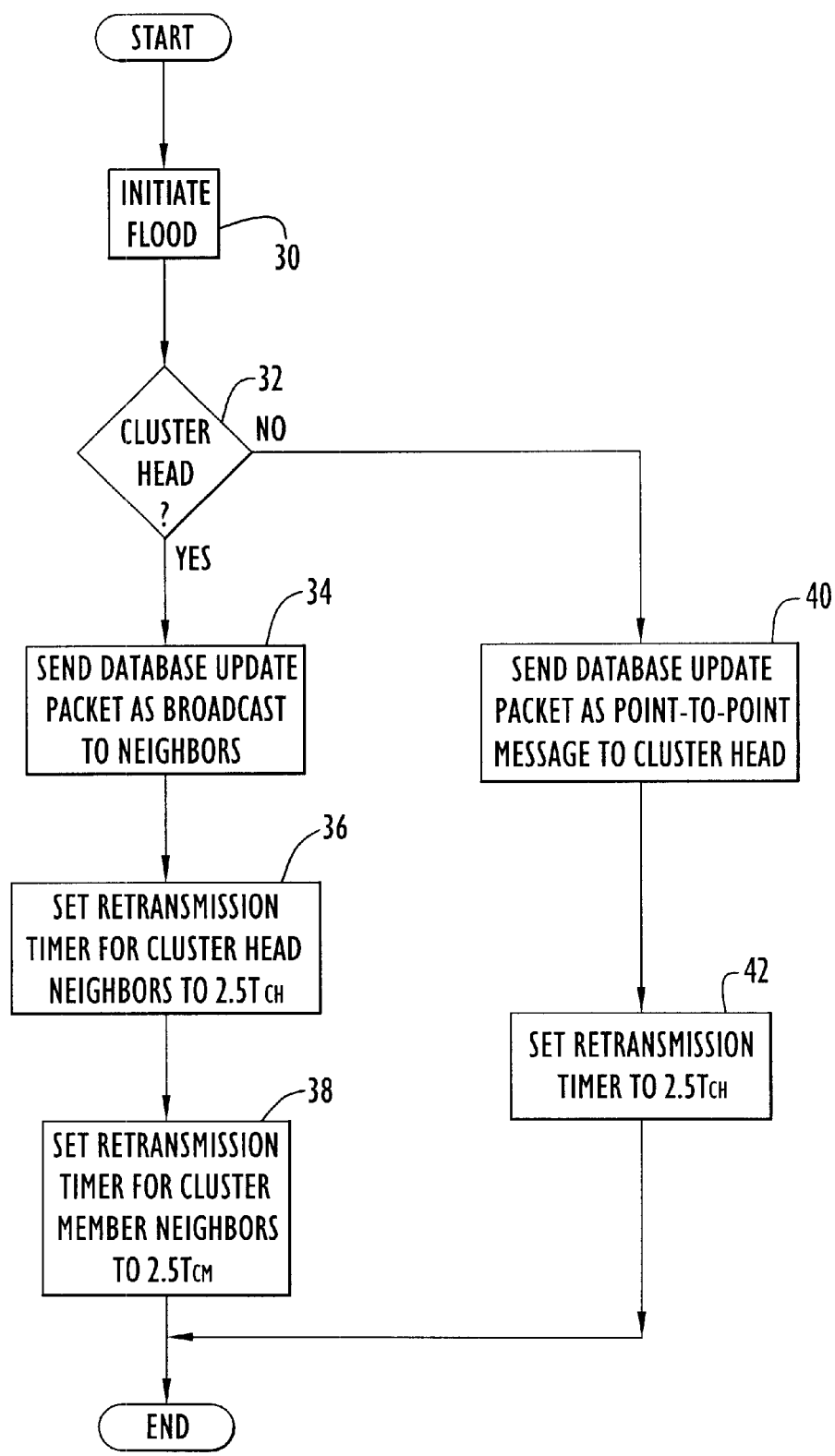
FIG. 2 is a procedural flow chart illustrating the manner in which a network node transmits database update packets to other network nodes according to the present invention.

The manner in which a node processor facilitates transmission or flooding of a database update packet according to the present invention is illustrated in FIG. 2. Specifically, an event (e.g., change in network topology, external network connected to network 2, reception of a database update packet, etc.) triggering transmission of a database update packet by a node occurs at step 30. If the node is designated as a cluster head node as determined at step 32, a database update packet is generated and transmitted or broadcasted to neighboring nodes the desired quantity of times at step 34. In particular, the generated database update packet is placed on a queue for transmission within an available intranet protocol node status packet as described above. The node status packet is periodically broadcasted through the network by each node to indicate the node's presence within the network as described above. In response to an available node status packet, the database update packet is removed from the queue and placed within the available packet for transmission to neighboring nodes via a reliable transmission scheme, such as the technique disclosed in the above-referenced co-pending application. Subsequent transmission of the database update packet the desired quantity of times, a timer for re-transmission of the database update packet to cluster head neighboring nodes is set at step 36 to preferably two and one-half times the time interval ($T_{CH}$) between transmissions of node status packets by a cluster head node. Similarly, a timer for re-transmission of a database update packet to corresponding member nodes is set at step 38 to preferably two and one-half times the time interval ($T_{CM}$) between transmissions of node status packets by a cluster member node. Since the database update packets are preferably transmitted two or more times to provide enhanced reliability, re-transmission of a database update packet to a succeeding hop should not be attempted in response to unacknowledged transmissions of that packet until the hop has had sufficient time to broadcast the database update packet the desired quantity of transmissions. Thus, the respective re-transmission timers are set at a minimum to the quantity of desired broadcast transmissions for a database update packet multiplied by the appropriate node status packet transmission interval for a cluster head or member node. Accordingly, since the present invention preferably transmits database update packets twice, the re-transmission timers are set, by way of example only, to approximately two and one-half times the appropriate node transmission intervals to provide a sufficient margin for re-transmission of database update packets. However, the re-transmission timers may be set to any desired intervals.

If the node transmitting the database update packet in response to an event is a cluster member node as determined at step 32, a database update packet is generated and transmitted as a point-to-point message to the corresponding cluster head node at step 40. Further, the timer for re-transmission of the database update packet is preferably set, by way of example only, to two and one-half times the time interval ($T_{CH}$) between transmissions of node status packets by a cluster head node. The timer is set to this value to provide sufficient time for the receiving cluster head node to transmit the database update packet to neighboring nodes for the desired quantity of transmissions prior to re-transmission of that database update packet as described above. In the event a re-transmission timer of a cluster head or member node expires, database update packets transmitted by the node that have not been acknowledged are re-transmitted as point-to-point messages to those neighbors associated with the expired timer (e.g., cluster head or member nodes) and not acknowledging receipt of the transmitted packets.

Figure 3:
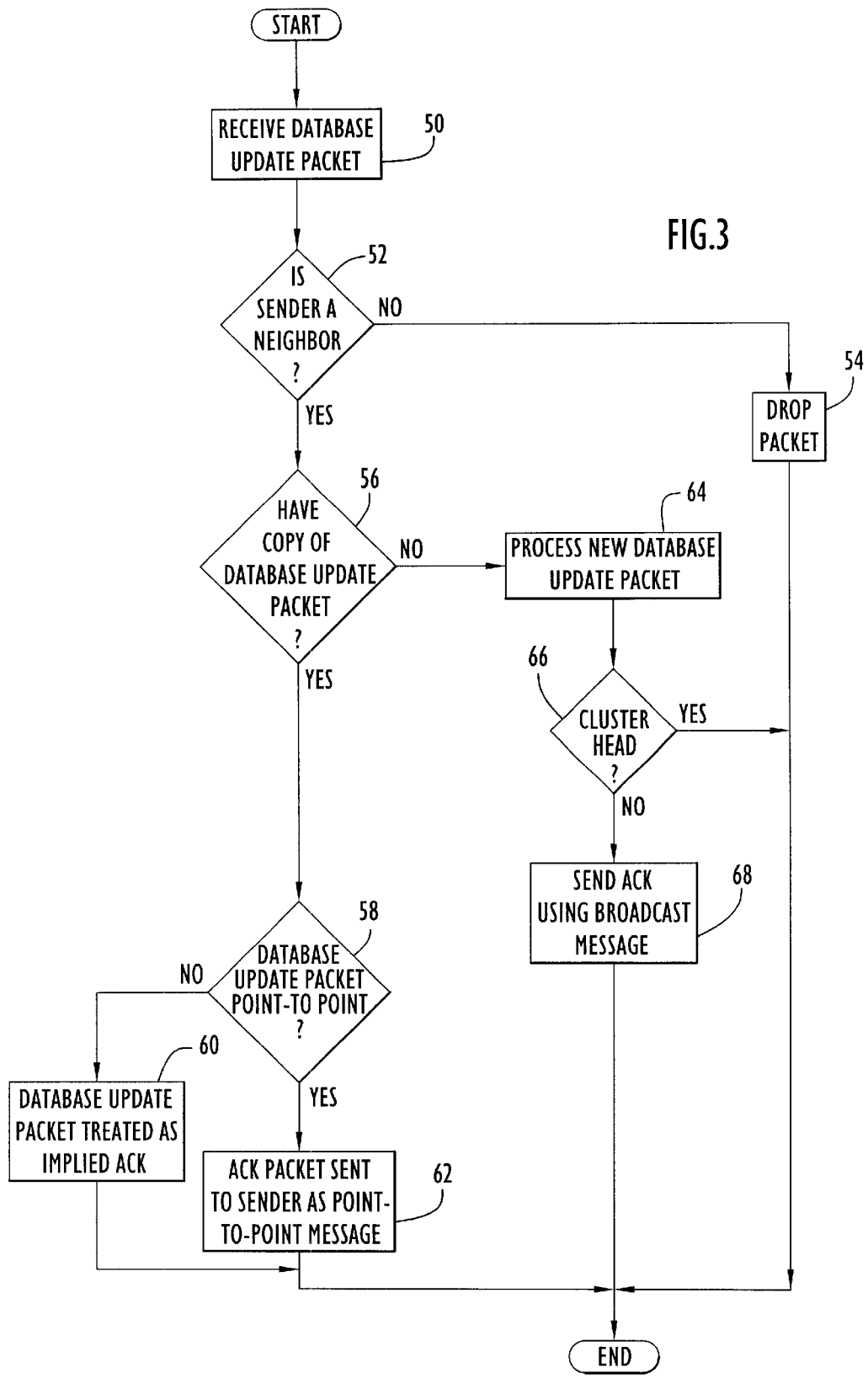
FIG. 3 is a procedural flow chart illustrating the manner in which a network node receives and processes database update packets according to the present invention.

The manner in which a node processor processes received database update packets according to the present invention is illustrated in FIG. 3. Initially, a database update packet is received by a node at step 50. The node may be a cluster head or member node where the database update packet may be received from a neighboring cluster head node either within an intranet protocol node status packet or as a point-to-point message for re-transmission of unacknowledged packets as described above. Alternatively, the node may be a cluster head node where the database update packet may be received from a corresponding member node as a point-to-point message as described above. If the packet is received from a node that is not a neighbor as determined from the node database at step 52, the packet is dropped at step 54. When the packet is received from a neighboring node, the node processor determines whether or not the received packet has already been received at step 56. If the packet has not been received, the packet is processed at step 64. This typically includes updating the node database with corresponding information contained in the received packet and flooding that packet within the network in the appropriate manner for a cluster head or member node described above. When the receiving node has been designated a cluster member node as determined at step 66, an OSPF type acknowledgment packet is sent to the sender of the received packet as a broadcast message at step 68. This packet is typically broadcasted via insertion within node status packets in substantially the same manner described above for database update packets. If the receiving node has been designated as a cluster head node, acknowledgments are implied in accordance with transmissions of database update packets as described below.

When the receiving node has already received the arriving database update packet as determined at step 56, the processor determines at step 58 if the received packet is a point-to-point message for re-transmission of an unacknowledged database update packet. If the message is a re-transmission of an unacknowledged database update packet, an OSPF type acknowledgment packet is transmitted to the sender as a point-to-point message at step 62. Otherwise, the packet is processed as an implied acknowledgment for database update packets transmitted by the receiving node. Basically, a network node interprets reception of a database update packet from a neighboring cluster head or member node as an acknowledgment when the receiving node is expecting an acknowledgment from the neighbor for the same database update packet previously sent to that neighbor by the receiving node. For example, an implied acknowledgment received by a cluster head or member node from a neighboring cluster head node may be in the form of a broadcasted database update packet when the neighboring cluster head node broadcasts a database update packet received from that cluster head or member node. Alternatively, the implied acknowledgment received by a cluster head node from a corresponding member node may be in the form of a point-to-point message when the cluster head node broadcasts a database update packet received from that member node. Thus, reception of a database update packet by a receiving node that previously transmitted the received packet indicates reception of that packet by the sending node (e.g., the node sending the implied acknowledgment). The various packets typically include identifiers or other information to indicate the source node and type of message (e.g., broadcast, point-to-point, node status packet, etc.) being sent.

Since the present invention utilizes intranet protocol node status packets to flood or broadcast ROSPF database update packets, limited additional packets are generated. In fact, the present invention typically requires one point-to-point message to transmit a database update packet across the exemplary two-tier network. Basically, the present invention sacrifices node status packet size for lower flooding packet rate. The node status and database update packets are relatively small in size, thereby minimizing impact on network performance. Further, the relatively small size of these packets reduces the database update packet flooding rate to drastically enhance network performance. Specifically, the conventional flooding technique within the ROSPF protocol described above requires H (e.g., where H is an integer generally greater than zero) point-to-point messages to flood one database update packet to an entire network. The value of H may be determined as follows:

$$H = 2N(C+M)$$

where C is an integer generally greater than zero and represents the average quantity of cluster member nodes within a cluster; M is an integer generally greater than zero and represents the average quantity of cluster head node neighbors; and N is an integer generally greater than zero and represents the quantity of cluster head nodes in a network. Table I below indicates the quantity of required transmissions to flood the database update packet within networks having various exemplary configurations. Since the present invention typically requires one point-to-point message, the protocol overhead is drastically reduced.

TABLE I

| N | C | M | Network Size (Nodes) | H (Conventional) | H (Present Invention) |
|---|---|---|---|---|---|
| 10 | 15 | 4 | 160 | 380 | 1 |
| 20 | 15 | 4 | 320 | 760 | 1 |
| 30 | 15 | 4 | 480 | 1140 | 1 |
| 40 | 15 | 4 | 640 | 1520 | 1 |
| 50 | 15 | 4 | 800 | 1900 | 1 |

Figure 4:
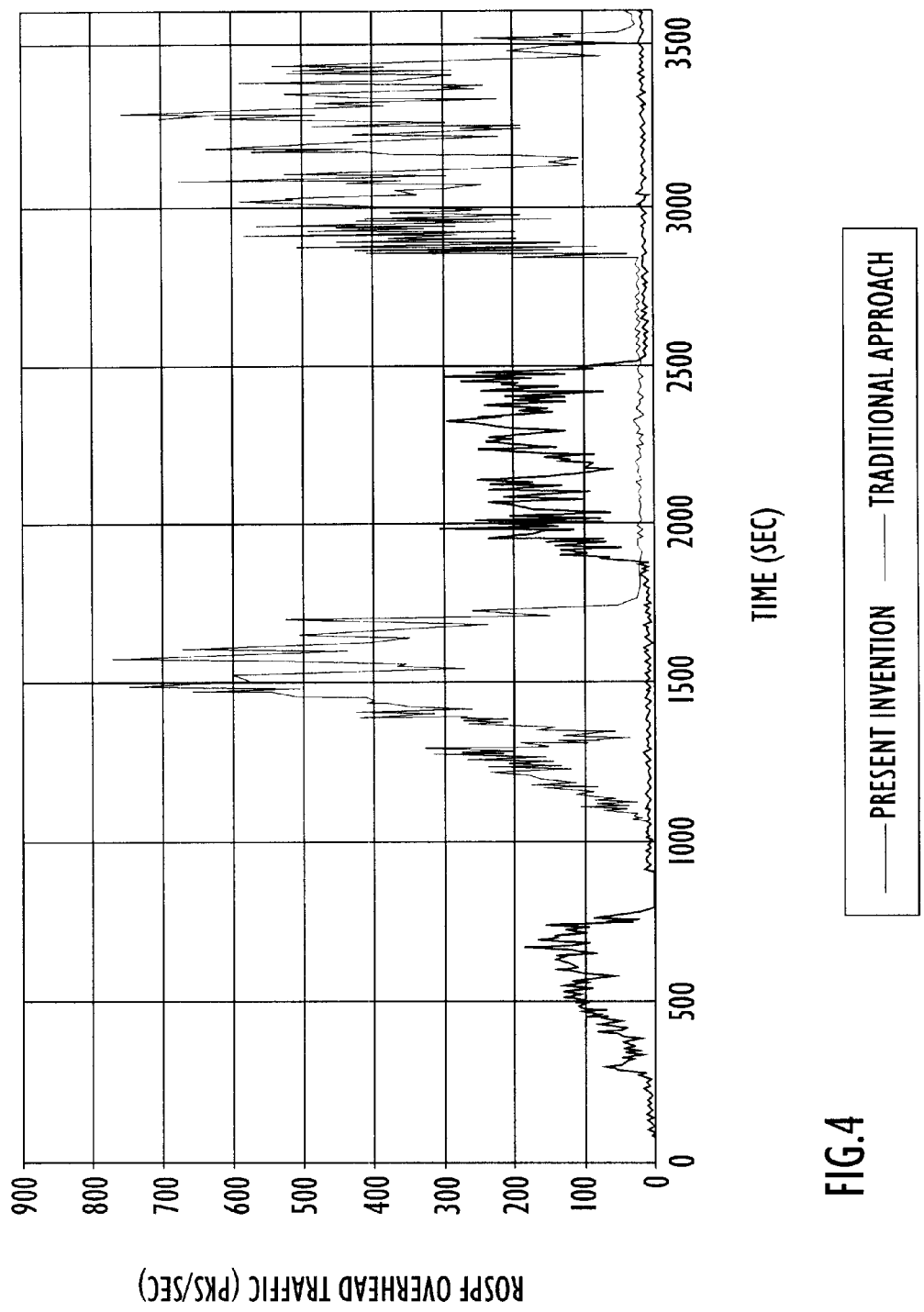
FIG. 4 is a graphical illustration of the relationship between the overhead generated by the present invention for transmission of database update packets and the overhead generated by conventional techniques for transmitting those packets.

In addition, the present invention has been simulated using a network simulation tool (e.g., OPNET available from Mil 3, Inc.). The results of the simulation indicating overhead generated by the present invention in relation to overhead generated by conventional flooding schemes is illustrated in FIG. 4. Thus, as Table I and FIG. 4 illustrate, the present invention significantly reduces generated overhead traffic during flooding.

The ROSPF database update packets are carried by intranet protocol node status packets to the next-hop destinations in accordance with the present invention. Since the node status packets are periodically transmitted and generally not immediately available, the present invention introduces latency when transmitting the database update packets to network nodes. However, the introduced latency has a minimal effect on protocol performance in the network. For example, network 2 may cover an area of one-hundred kilometers by two-hundred kilometers where flooding a database update packet typically requires less than twenty hops to cover a two-hundred kilometer distance depending upon the node radio range. Thus, a maximum delay for reception of a database update packet by a node is $20T_{CH}$ or one-hundred seconds where the cluster head transmission interval ($T_{CH}$) is approximately five seconds. Since the maximum life span of a database update packet is approximately one-hour, the delays or latency introduced by the present invention are small in comparison to that life span (e.g., less than 3% of the maximum database update packet life span).

It will be appreciated that the embodiments described above and illustrated in the drawings represent only a few of the many ways of implementing a method and apparatus for transmission of node link status messages throughout a network with reduced communication protocol overhead traffic.

The communication networks employing the present invention nodes may include any quantity of those nodes or tiers. The network nodes may be arranged in any fashion into any quantity of clusters or cells each having any quantity of nodes and head nodes. The backbone network may include any quantity of head nodes, while communications within a cluster and between neighboring cluster head nodes of the backbone network may utilize the same or different transmission frequencies. The formation of cells and designation of head nodes may be predetermined or accomplished dynamically via any conventional or other algorithm or technique. The nodes may communicate via any suitable communications medium (e.g., wired or wireless communication devices, etc.). The present invention node may include any quantity of conventional or other transmitters, where each transmitter may transmit signals at any suitable frequency and in any suitable energy form (e.g., radio signals, microwave, optical signals, etc.), and any quantity of conventional or other receivers, where each receiver may receive signals at any suitable frequency and in any suitable energy form (e.g., radio signals, microwave, optical signals, etc.). Alternatively, the present invention node may include any quantity of combined transmitting/receiving devices.

The processor of the present invention node may be implemented by any conventional or other microprocessor, controller or circuitry to perform the functions described herein, while any quantity of processors or processing devices or circuitry may be employed within the present invention node where the processor functions may be distributed in any fashion among any quantity of modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate distribution of packets within the network in the manner described above.

The LSA, node status, database update and other packets or messages (e.g., acknowledge, point-to-point message, broadcast message, etc.) may be of any size, may have any format, and may contain any desired information. The packets may be transmitted at any suitable transmission rate or have any desired interval between transmissions. The re-transmission timers may be implemented by any conventional or other timing mechanisms (e.g., processor clock, external hardware, software, etc.) and may be set to any desired intervals for re-transmission of any packets. The timers may be associated with any types of packets to indicate re-transmission of those packets. The member nodes may communicate a database update, acknowledgment or other type of packet to a cluster head node via any type of message. Further, the various messages may include any identifier to identify the type of message or packet. The database update or other packets may be broadcasted or transmitted any quantity of times to achieve a desired success rate, where the repeated packets may be disposed within the same or different node status packets in any desired combination or fashion.

The communication network may employ any suitable intranet and/or internetworking communications protocols to facilitate reception, processing and transference of messages or packets within or external of the network. The present invention may be utilized within any intranet, internetworking or other protocol to transmit or flood messages within the network in accordance with that protocol. The insertion of the database update packets within the node status packet may be accomplished within any layer of the intranet or other protocol. The node database may be implemented by any conventional database or other storage structure (e.g., processor memory, external memory, file, data structure (e.g., array, queue, stack, etc.), etc.) and may have any desired storage capacity to contain any desired information. The queue may be implemented by any conventional or other storage unit or structure (e.g., processor memory, external memory, file, data structure (e.g., array, queue, stack, etc.), etc.) having any desired storage capacity to store database update or other messages for subsequent processing. The queue may be implemented by any suitable data structure employing any algorithm for insertion and removal of data (e.g., LIFO, FIFO, etc.).

The database update and node status packets may be transmitted at any desired intervals and/or in response to any desired events or conditions. The node status packets may receive any quantity of database update packets, and may alternatively be utilized to broadcast any types of messages throughout the network. Similarly, any intranet protocol messages may be inserted within internetworking protocol packets for distribution throughout the network. The acknowledgments may be implied in any manner indicating reception of a packet by a destination node, or transmission of an acknowledgment from a receiving node may be required by a transmitting node. Packets may be re-transmitted in response to any suitable conditions, and may be sent via any type of messages (e.g., broadcast, point-to-point, etc.). The cluster head and member nodes may transmit database update or other packets to any neighboring cluster head or member nodes to distribute packets to those nodes and/or throughout the network.

It is to be understood that the present invention is not limited to the applications or networks described herein, but may be utilized for various communication applications or networks, especially those including wireless radio networks employing OSPF type internet routing protocols. Further, the present invention may be applied to any link-state routing protocol and to the flooding of any link-state based advertisements or other messages. Moreover, the present invention may be applied to various networks and communications applications to transmit or flood status or other messages throughout the network with reduced communication protocol overhead traffic.

From the foregoing description, it will be appreciated that the invention makes available a novel method and apparatus for transmission of node link status messages throughout a network with reduced communication protocol overhead traffic wherein database update packets of an internetworking protocol are transmitted within node status packets of an intranet protocol to flood the database update packets within a network for database synchronization.

Having described preferred embodiments of a new and improved method and apparatus for transmission of node link status messages throughout a network with reduced communication protocol overhead traffic, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communications network, a communication unit to transmit and receive messages within said network comprising:
   a transmitter to transmit an outgoing message to at least one other communication unit within said network;
   a receiver to receive an incoming message from at least one other communication unit within said network; and
   a processor to control said transmission and reception of said outgoing and incoming messages, wherein said processor includes:
   a broadcast module to facilitate periodic transmission of a unit message to said at least one other communication unit, wherein said unit message includes information relating to a status of said communication unit; and
   a message module to insert a broadcast message within said unit message to facilitate transmission of said broadcast message to said at least one other communication unit in conjunction with transmission of said unit message.

2. The unit of claim 1 wherein said transmitter transmits said outgoing message in the form of radio signals.

3. The unit of claim 1 wherein said receiver receives said incoming message in the form of radio signals.

4. The unit of claim 1 wherein said processor further includes a storage unit to store said broadcast message until a succeeding transmission time for said unit message.

5. The unit of claim 4 wherein said storage unit stores a plurality of broadcast messages, and said message module inserts at least one of said stored messages within said unit message.

6. The unit of claim 1 wherein said processor further includes:
   an internal communications module to facilitate communications within said network in accordance with an intranet protocol; and
   an external communications module to facilitate communications between said network and an external network in accordance with an internetworking protocol.

7. The unit of claim 6 wherein said internetworking protocol includes a Radio Open Shortest Path First protocol.

8. The unit of claim 6 wherein:
   said unit message is associated with said intranet protocol and said broadcast module periodically transmits said unit message in accordance with said intranet protocol; and
   said broadcast message is associated with said internetworking protocol and said message module inserts said internetworking protocol broadcast message into said intranet protocol unit message to facilitate transmission of said broadcast message in conjunction with said transmission of said intranet protocol unit message.

9. The unit of claim 6 wherein:
   said communications network includes a plurality of clusters each having a plurality of said communication units, wherein one of said communication units of each said cluster is designated as a head unit with remaining communication units of that cluster being designated as member units;
   head units of said clusters communicate with each other and with corresponding member units of that cluster to facilitate communications between and within said clusters;
   said processor further includes a database to store information indicating particular network communication units in communication with said communication unit, wherein a database update message including information relating to a current status of network connections is distributed throughout said network in accordance with said internetworking protocol to synchronize said database of each said communication unit.

10. The unit of claim 9 wherein said processor further includes a transmission control module to facilitate transmission of said outgoing messages, wherein said transmission control module includes:
   a head unit transmission module to facilitate transmission of said database update message as said broadcast message inserted within said unit message in response to said communication unit being designated as a head unit; and a member transmission module to facilitate transmission of said database update message from said communication unit directly to a corresponding head unit in response to said communication unit being designated as a member unit.

11. The unit of claim 10 wherein said transmission control module further includes:

a head unit timer module to set head unit timers subsequent transmission of said database update message by said head unit transmission module and in response to said communication unit being designated as a head unit, wherein said head unit timers indicate a time for re-transmission of said database update message to corresponding member units and other head units;

a member timer module to set a member unit timer subsequent transmission of said database update message by said member transmission module and in response to said communication unit being designated as a member unit, wherein said member unit timer indicates a time for re-transmission of said database update message to a corresponding head unit; and a re-transmission module to facilitate re-transmission of said database update message in response to expiration of a member or head unit timer, wherein said database update message is re-transmitted directly to communication units associated with said expired timer and that have not acknowledged receipt of said database update message.

12. The unit of claim 11 wherein said head unit transmission module facilitates transmission of said database update message at least two times and said head unit timer module sets said head unit timers subsequent transmission of said database update packet said at least two times.

13. The unit of claim 10 wherein said processor further includes:

a reception module to facilitate reception and processing of messages including said unit and database update messages, wherein said reception module includes:

an implied acknowledgment module for processing said received message as an acknowledgment message in response to said received message being an initial transmission of a database update packet previously received by said communication unit.

14. The unit of claim 13 wherein said reception module further includes:

a message discard module to discard a received message in response to determining that said received message is not received from a neighboring communication unit as indicated by said communication unit database; and a message processing module to process a received database update message in response to determining that said received database update message has not been previously received by said communication unit, wherein said processing module includes:

a database update module to update said database with information contained within said received database update message;

a member acknowledgment module to facilitate transmission of an acknowledgment message as said broadcast message inserted within said unit message in response to receiving said database update message and said communication unit being designated as a member unit;

a head unit forwarding module to facilitate transmission of said processed database update message by said head unit transmission module in response to said communication unit being designated as a head unit; and a member unit forwarding module to facilitate transmission of said processed database update message by said member transmission module in response to said communication unit being designated as a member unit.

15. The unit of claim 13 wherein said reception module further includes:

a re-transmission acknowledgment module to facilitate transmission of an acknowledgment message directly to a communication unit transmitting said received database update message in response to said received database update message being a re-transmission of a database update packet previously received by said communication unit.

16. In a communications network, a method of transmitting and receiving messages between communication units within said network comprising the steps of:

(a) periodically transmitting a unit message within said network from each communication unit, wherein said unit message includes information relating to a status of a corresponding communication unit transmitting that unit message; and (b) inserting a broadcast message within a corresponding unit message of said each communication unit to transmit said broadcast message in conjunction with transmission of said corresponding unit message.

17. The method of claim 16 wherein step (a) further includes:

(a.1) transmitting said unit message from said each communication unit in the form of radio signals.

18. The method of claim 16 wherein step (b) further includes:

(b.1) storing said broadcast message in a storage device within said each communication unit until a succeeding transmission time for said corresponding unit message.

19. The method of claim 18 wherein step (b.1) further includes:

(b.1.1) storing a plurality of broadcast messages within said storage unit of said each communication unit and inserting at least one of said stored messages within said corresponding unit message.

20. The method of claim 16 wherein step (a) further includes:

(a.1) facilitating communications within said network in accordance with an intranet protocol; and (a.2) facilitating communications between said network and an external network in accordance with an inter-networking protocol.

21. The method of claim 20 wherein step (a.2) further includes:

(a.2.1) facilitating communications between said network and an external network in accordance with a Radio Open Shortest Path First protocol.

22. The method of claim 20 wherein said unit message is associated with said intranet protocol and said broadcast message is associated with said internetworking protocol, and step (a.1) further includes:

(a.1.1) periodically transmitting said unit message from said each communication unit in accordance with said intranet protocol; and step (b) further includes:
- (b.1) inserting said internetworking protocol broadcast message into said corresponding intranet protocol unit message to facilitate transmission of said broadcast message in conjunction with said transmission of said corresponding intranet protocol unit message.

23. The method of claim 20 wherein said communications network includes a plurality of clusters each having a plurality of said communication units, wherein one of said communication units of each said cluster is designated as a head unit with remaining communication units of that cluster being designated as member units, wherein head units of said clusters communicate with each other and with corresponding member units of that cluster to facilitate communications between and within said clusters, and wherein step (a.2) further includes:
- (a.2.1) storing information within a database of said each communication unit indicating particular network communication units in communication with that communication unit; and
- (a.2.2) distributing a database update message including information relating to a current status of network connections throughout said network in accordance with said internetworking protocol to synchronize said database of said each communication unit.

24. The method of claim 23 wherein step (a.2.2) further includes:
- (a.2.2.1) transmitting said database update message from each member unit receiving said database update message directly to a corresponding head unit; and step (b) further includes:
- (b.1) transmitting said database update message from each head unit receiving said database update message as said broadcast message inserted within said corresponding unit message.

25. The method of claim 24 wherein step (a.2.2) further includes:
- (a.2.2.2) setting a member unit timer within each said member unit transmitting a corresponding database update message subsequent said transmission in step (a.2.2.1), wherein said member unit timer indicates a time for re-transmission of said corresponding database update message to a corresponding head unit; and step (b) further includes:
- (b.2) setting head unit timers within each said head unit transmitting a corresponding database update message subsequent said transmission in step (b.1), wherein said head unit timers indicate a time for re-transmission of said corresponding database update message to corresponding member units and other head units;
- (b.3) re-transmitting said database update message from each said head unit having an expired head unit timer, wherein said database update message is re-transmitted from those head units directly to communication units associated with a corresponding expired timer that have not acknowledged receipt of said database update message; and
- (b.4) re-transmitting said database update message from each said member unit having an expired member unit timer, wherein said database update message is re-transmitted from those member units directly to a corresponding head unit that has not acknowledged receipt of said database update message.

26. The method of claim 25 wherein step (b.1) further includes:
- (b.1.1) transmitting said database update message at least two times from said each head unit receiving said database update message; and step (b.2) further includes:
- (b.2.1) setting said head unit timers within said each head unit transmitting said database update message subsequent transmission of said corresponding database update message said at least two times.

27. The method of claim 24 further including the step of:
- (c) receiving and processing messages including said unit and database update messages within said each communication unit, wherein step (c) further includes:
  - (c.1) processing a received message as an acknowledgment message within each said communication unit in response to said received message being an initial transmission of a database update message previously received by that communication unit.

28. The method of claim 27 wherein step (c) further includes:
- (c.2) discarding a received message within said each communication unit in response to determining that said received message is not received from a neighboring communication unit as indicated by said database of that communication unit; and
- (c.3) processing a received database update message within said each communication unit in response to determining that said received database update message has not been previously received by that communication unit, wherein step (c.3) further includes:
  - (c.3.1) updating said database of said each communication unit with information contained within a corresponding received database update message;
  - (c.3.2) transmitting an acknowledgment message from each member unit as said broadcast message inserted within said unit message in response to that member unit receiving said database update message;
  - (c.3.3) facilitating transmission of said processed database update message from said each head unit as said broadcast message inserted within said unit message in response to that head unit receiving said database update message; and
  - (c.3.4) facilitating transmission of said processed database update message from said each member unit directly to a corresponding head unit in response to that member unit receiving said database update message.

29. The method of claim 27 wherein step (c) further includes:
- (c.2) transmitting an acknowledgment message from said each communication unit directly to a communication unit transmitting said received database update message in response to that communication unit receiving said database update message as a re-transmission of a database update message previously received by that communication unit.

30. A communication network comprising:
a plurality of clusters each having a plurality of communication units, wherein one of said communication units of each said cluster is designated as a head unit with remaining communication units of that cluster being designated as member units, wherein head units of said clusters communicate with each other and with corresponding member units of that cluster to facilitate communications between and within said clusters;

wherein each said head unit includes:
- a head unit transmission module to periodically transmit a unit message within said network, wherein said unit message includes information relating to a status of that head unit; and
- a message broadcast module to insert a broadcast message within said unit message to facilitate transmission of said broadcast message within said network in conjunction with transmission of said unit message;

wherein each said member unit includes:
- a member unit transmission module to transmit said broadcast message directly to a corresponding head unit to facilitate transmission of said broadcast message throughout said network via said corresponding head unit.

31. The network of claim 30 wherein said each head unit and member unit transmits messages in the form of radio signals.

32. The network of claim 30 wherein said each head unit and member unit further includes a database to store information indicating particular communication units in communication with that unit, wherein said head and member units transmit a database update message including information relating to a current status of network connections as said broadcast message to synchronize each said database.

33. The network of claim 32 wherein said each head unit and member unit further includes:
- a reception module to facilitate reception and processing of messages including said unit and database update messages, wherein said reception module includes:
  - an implied acknowledgment module for processing a received database update message as an acknowledgment message in response to said received database update message being an initial transmission of a database update message previously received by that unit.

34. In a communication network including a plurality of clusters each having a plurality of communication units, wherein one of said communication units of each said cluster is designated as a head unit with remaining communication units of that cluster being designated as member units, wherein head units of said clusters communicate with each other and with corresponding member units of that cluster to facilitate communications between and within said clusters, a method of transmitting messages within said network comprising the steps of:

(a) periodically transmitting a unit message within said network from each said head unit, wherein said unit message includes information relating to a status of that head unit;

(b) inserting a broadcast message within said unit message by said each head unit receiving said broadcast message to facilitate transmission of said broadcast message within said network in conjunction with transmission of said unit message; and (c) transmitting said broadcast message from each said member unit receiving that message directly to a corresponding head unit to facilitate transmission of said broadcast message throughout said network via said corresponding head unit.

35. The method of claim 34 wherein said each head unit and member unit transmits messages in the form of radio signals.

36. The method of claim 34 wherein said each head unit and member unit includes a database to store information indicating particular communication units in communication with that unit, wherein step (b) further includes:

(b.1) inserting a database update message including information relating to a current status of network connections within said unit message by said each head unit receiving said database update message to facilitate transmission of said database update message within said network to synchronize said each database; and step (c) further includes:

(c.1) transmitting said database update message from each said member unit receiving that message directly to a corresponding head unit to facilitate transmission of said database update message throughout said network via said corresponding head unit.

37. The method of claim 36 further including the step of:

(d) receiving and processing messages including said unit and database update messages by said each head unit and member unit, wherein step (d) further includes:

(d.1) processing a received database update message as an acknowledgment message by each said head unit and member unit receiving said database update message in response to said received database update message being an initial transmission of a database update message previously received by that unit.

* * * * *